(12) United States Patent
Kipersztok et al.

(10) Patent No.: US 11,708,174 B2
(45) Date of Patent: Jul. 25, 2023

(54) TIME-SENSITIVE AIRCRAFT TAKE-OFF DECISION

(71) Applicant: THE BOEING COMPANY, Chicago, IL (US)

(72) Inventors: Oscar Kipersztok, Redmond, WA (US); David J. Finton, Lynnwood, WA (US)

(73) Assignee: THE BOEING COMPANY, Arlington, VA (US)

( * ) Notice: Subject to any disclaimer, the term of this patent is extended or adjusted under 35 U.S.C. 154(b) by 560 days.

(21) Appl. No.: 15/914,627

(22) Filed: Mar. 7, 2018

(65) Prior Publication Data

US 2019/0276160 A1 Sep. 12, 2019

(51) Int. Cl.
*B64D 45/00* (2006.01)
*G01C 23/00* (2006.01)
*G05D 1/06* (2006.01)

(52) U.S. Cl.
CPC ............ *B64D 45/00* (2013.01); *G01C 23/00* (2013.01); *G05D 1/0661* (2013.01)

(58) Field of Classification Search
CPC ...... B64D 45/00; B64C 25/426; G01C 23/00; G01C 21/00; G05D 1/0661; G01S 5/00; G08G 5/0021
See application file for complete search history.

(56) References Cited

U.S. PATENT DOCUMENTS

| | | | | |
|---|---|---|---|---|
| 4,454,582 A | * | 6/1984 | Cleary | B64C 25/426 340/972 |
| 5,103,224 A | * | 4/1992 | Arad | G08G 5/0065 340/959 |
| 5,353,022 A | * | 10/1994 | Middleton | G08G 5/025 340/959 |
| 5,480,107 A | * | 1/1996 | Bacon | B64D 27/023 244/55 |
| 6,790,041 B2 | | 9/2004 | Fountain | |
| 2008/0215198 A1 | * | 9/2008 | Richards | G08G 5/0021 701/15 |
| 2014/0257603 A1 | * | 9/2014 | McKeown | B64D 45/00 701/16 |
| 2018/0061243 A1 | * | 3/2018 | Shloosh | G08G 5/0013 |

FOREIGN PATENT DOCUMENTS

JP 06298022 A * 10/1994

* cited by examiner

*Primary Examiner* — Christian Chace
(74) *Attorney, Agent, or Firm* — Moore IP Law

(57) ABSTRACT

An aircraft includes an engine and a system that is configured to detect an event associated with the engine during a take-off. The system is further configured to determine a speed of the aircraft a particular time after the event and to determine a remaining distance between the aircraft and an end of a runway at the particular time. The system is also configured to compare the speed of the aircraft to a take-off rejection speed threshold. The take-off rejection speed threshold indicates a maximum aircraft speed that would result in the aircraft stopping prior to a particular distance from the end of the runway. The take-off rejection speed threshold is selected from a plurality of aircraft speeds generated during aircraft deceleration simulations. The system is also configured to generate an indication recommending whether to continue the take-off based on comparison.

22 Claims, 12 Drawing Sheets

TIME-SENSITIVE AIRCRAFT TAKE-OFF DECISION

FIELD OF THE DISCLOSURE

The present disclosure is related to a device that generates a recommendation regarding whether to continue an aircraft take-off.

BACKGROUND

During take-off of an aircraft, an engine-related event may occur that would result in a less than optimal flight experience. The decision of whether to continue the take-off, in the event that the engine-related event occurs, is a time-sensitive decision. For example, a pilot of the aircraft has a relatively short amount of time to decide whether to complete the take-off or reject the take-off.

SUMMARY

According to one implementation of the present disclosure, a method for generating a recommendation during a take-off associated with an aircraft includes detecting an engine-related event during the take-off. The method also includes comparing a speed of the aircraft to a take-off rejection speed threshold. The take-off rejection speed threshold indicates a maximum aircraft speed that would result in the aircraft stopping prior to a particular distance from an end of a runway. The take-off rejection speed threshold is selected from a plurality of aircraft speeds generated during aircraft deceleration simulations. The method also includes generating an indication recommending whether to continue the take-off based on comparison. The indication recommends discontinuing the take-off if the speed of the aircraft is less than or equal to the take-off rejection speed threshold, and the indication recommends continuing the take-off if the speed of the aircraft is greater than the take-off rejection speed threshold.

According to another implementation of the present disclosure, an aircraft includes an engine and a system that is configured to detect an event associated with the engine during a take-off. The system is also configured to compare a speed of the aircraft to a take-off rejection speed threshold. The take-off rejection speed threshold indicates a maximum aircraft speed that would result in the aircraft stopping prior to a particular distance from an end of a runway. The take-off rejection speed threshold is selected from a plurality of aircraft speeds generated during aircraft deceleration simulations. The system is also configured to generate an indication recommending whether to continue the take-off based on comparison. The indication recommends discontinuing the take-off if the speed of the aircraft is less than or equal to the take-off rejection speed threshold, and the indication recommends continuing the take-off if the speed of the aircraft is greater than the take-off rejection speed threshold.

According to another implementation of the present disclosure, a method for generating a look-up table includes receiving different sets of aircraft parameters at an aircraft simulator. Each set of aircraft parameters indicates at least an aircraft weight and a runway length. For each set of aircraft parameters, the method includes performing aircraft deceleration simulations to estimate a maximum aircraft speed that would enable an aircraft, having a corresponding set of aircraft parameters, to stop prior to a particular distance from an end of an associated runway. The method also includes generating the look-up table based on the aircraft deceleration simulations. The look-up table indicates a plurality of aircraft speeds, and each aircraft speed of the plurality of aircraft speeds indicates the maximum aircraft speed for the corresponding set of aircraft parameters.

According to another implementation of the present disclosure, an aircraft simulator includes an interface configured to receive different sets of aircraft parameters. Each set of aircraft parameters indicates at least an aircraft weight and a runway length. The aircraft simulator also includes a processor coupled to the interface, the processor is configured to perform aircraft deceleration simulations for each set of aircraft parameters. The aircraft decelerations simulations are used to estimate a maximum aircraft speed that would enable an aircraft, having a corresponding set of aircraft parameters, to stop prior to a particular distance from an end of an associated runway. The processor is also configured to generate a look-up table based on the aircraft deceleration simulations. The look-up table indicates a plurality of aircraft speeds, and each aircraft speed of the plurality of aircraft speeds indicates the maximum aircraft speed for the corresponding set of aircraft parameters.

According to another implementation of the present disclosure, a method for generating a recommendation includes detecting, at a vehicle, a hazard along a path of the vehicle. The method also includes comparing a speed of the vehicle to a speed threshold. The speed threshold indicates a maximum speed that would result in the vehicle stopping prior to a particular distance from the hazard. The speed threshold is selected from a plurality of speeds generated during deceleration simulations. The method also includes generating an indication recommending whether to redirect the vehicle based on the comparison. The indication recommends redirecting the vehicle if the speed of the vehicle is greater than the speed threshold. The indication recommends bypassing redirection of the vehicle if the speed of the vehicle is less than or equal to the speed threshold.

One advantage of the above-described implementation is that a recommendation can be made indicating whether to continue a take-off after an engine-related event is detected. For example, the recommendation informs the pilot of an aircraft if the aircraft can stop safely short of the end of a runway. If the aircraft cannot stop safely short of the end of the runway, the pilot can continue the take-off and subsequently land the aircraft to have the engine-related event resolved. Additionally, the features, functions, and advantages that have been described can be achieved independently in various implementations or may be combined in yet other implementations, further details of which are disclosed with reference to the following description and drawings.

DETAILED DESCRIPTION

Figure 1A:
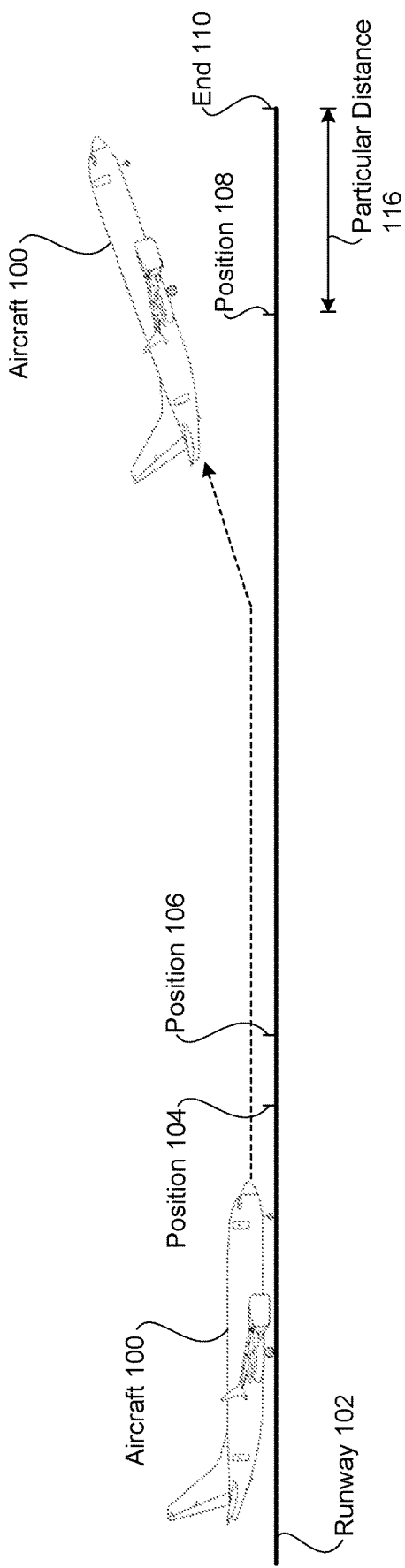
FIG. 1A is a diagram of an aircraft continuing a take-off after detection of an engine-related event.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable a device to generate a recommendation indicating whether to continue an aircraft take-off when an engine-related event associated with an aircraft is detected during the aircraft take-off. For example, the device determines a take-off rejection speed based on aircraft deceleration simulations that are generated by an aircraft simulator. The aircraft deceleration simulations indicate a distance it would take for a particular aircraft, having substantially similar parameters as the aircraft, to stop at different speeds. For example, the particular aircraft used in the simulation may have a similar take-off (or initial) weight as the aircraft. Other parameters, such as runway length, wind speed, wind direction, and runway friction, may be considered in determining the stopping distances at different speeds. Thus, based on the parameters, the aircraft simulator estimates a maximum aircraft speed (e.g., the take-off rejection speed) that would result in the particular aircraft stopping prior to a particular distance from an end of a runway. The device uses a speed of the aircraft when the engine-related event occurs and compares it to the take-off rejection speed (determined by the aircraft simulator) to determine whether to continue the aircraft take-off. To illustrate, if the speed of the aircraft is greater than the take-off rejection speed for the aircraft determined during the aircraft deceleration simulations, the device recommends continuance of the aircraft take-off. For example, the device recommends that a pilot of the aircraft continue the aircraft take-off and subsequently land the aircraft to have the engine-related event resolved. However, if the speed of the aircraft is less than or equal to the take-off rejection speed, the device recommends discontinuance of the aircraft take-off. For example, the device recommends that the pilot decelerate the aircraft to have the engine-related event resolved. Thus, the techniques described herein enable a fast response time (to the engine-related event) for generating the recommendation because although the recommendation is based on multiple parameters (e.g., aircraft weight, runway length, etc.), only a single parameter (e.g., the take-off rejection speed) is used to perform the look-up after the engine-related event.

FIG. 1A is a diagram of an aircraft 100 continuing with a take-off after detection of an engine-related event. For example, the aircraft 100 is positioned on a runway 102 and a speed of the aircraft 100 increases as the aircraft 100 moves along the runway 102 (from left to right). After the speed of the aircraft 100 reaches a take-off speed, the aircraft 100 transitions from moving along the runway 102 to flight.

According to FIG. 1A, the aircraft 100 may experience an engine-related event at a position 104 along the runway 102. For example, as the aircraft 100 is accelerating during the take-off, the engine-related event occurs when the aircraft 100 is at the position 104. As described herein, the "engine-related event" is an event or occurrence that could result in a suboptimal flight. As non-limiting examples, the engine-related event may include an engine shutdown, a lower than expected thrust output, etc. A particular time after the engine-related event is detected, the aircraft 100 is at a position 106 on the runway 102. The particular time corresponds to an amount of time between detection of an engine-related event and generation of a recommendation associated with take-off continuance. According to one implementation, the particular time corresponds to less than one second (e.g., milliseconds). According to another implementation, the particular time corresponds to one second or greater.

Figure 1B:
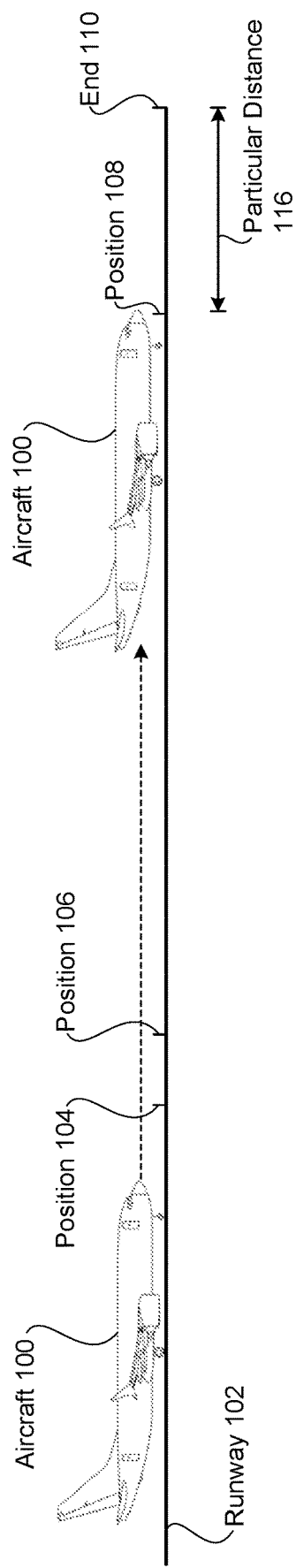
FIG. 1B is a diagram of the aircraft discontinuing the take-off after detection of the engine-related event.
Figure 2A:
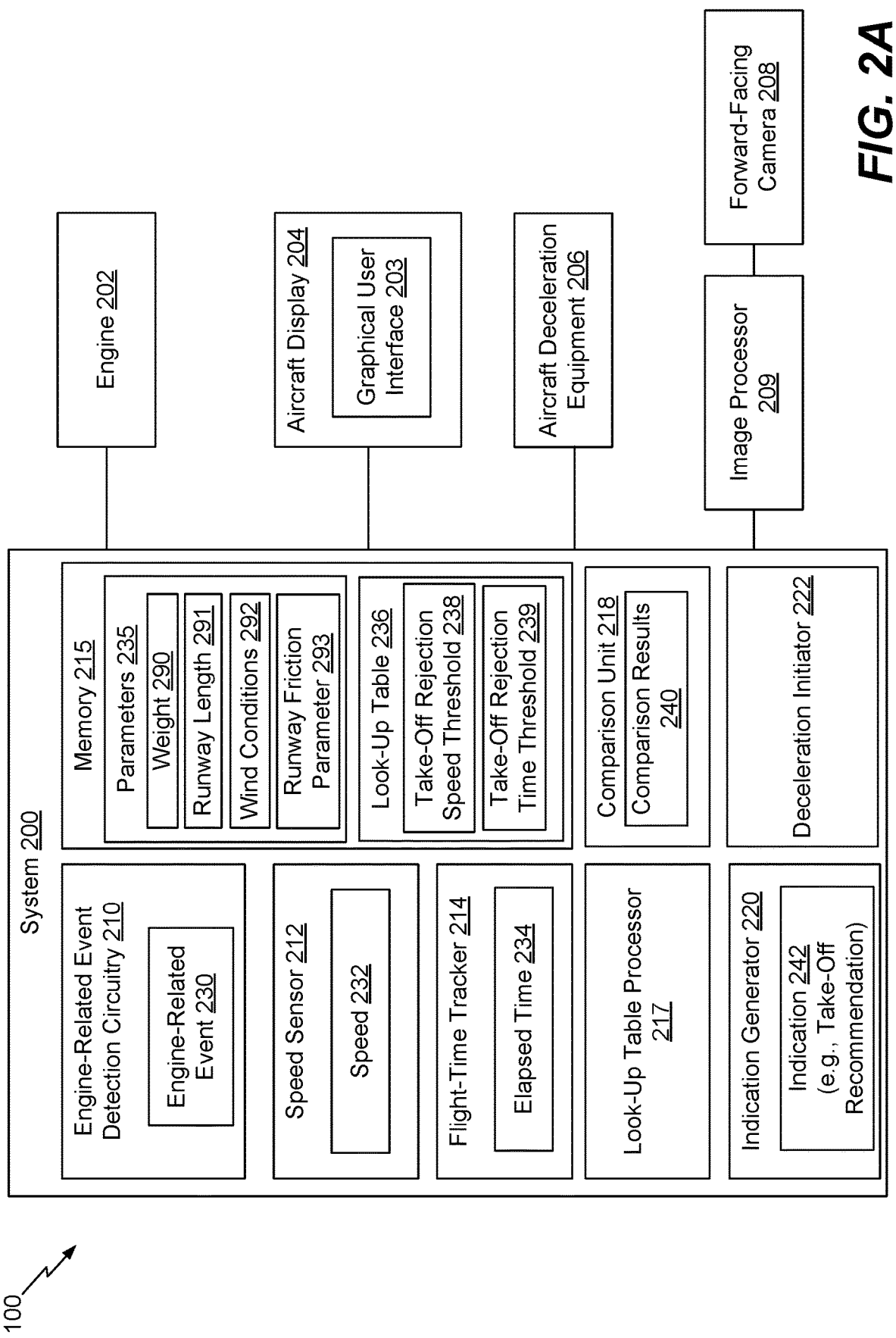
FIG. 2A is a block diagram of the aircraft of FIGS. 1A-1B.

When the aircraft 100 is at the position 106, as described in greater detail with respect to FIG. 2A, a system 200 within the aircraft 100 recommends whether to continue the take-off (as illustrated in FIG. 1A) or to discontinue the take-off (as illustrated in FIG. 1B). The decision of whether to continue (or discontinue) the take-off is based on a speed of the aircraft 100 and a take-off rejection speed threshold.

Figure 2B:
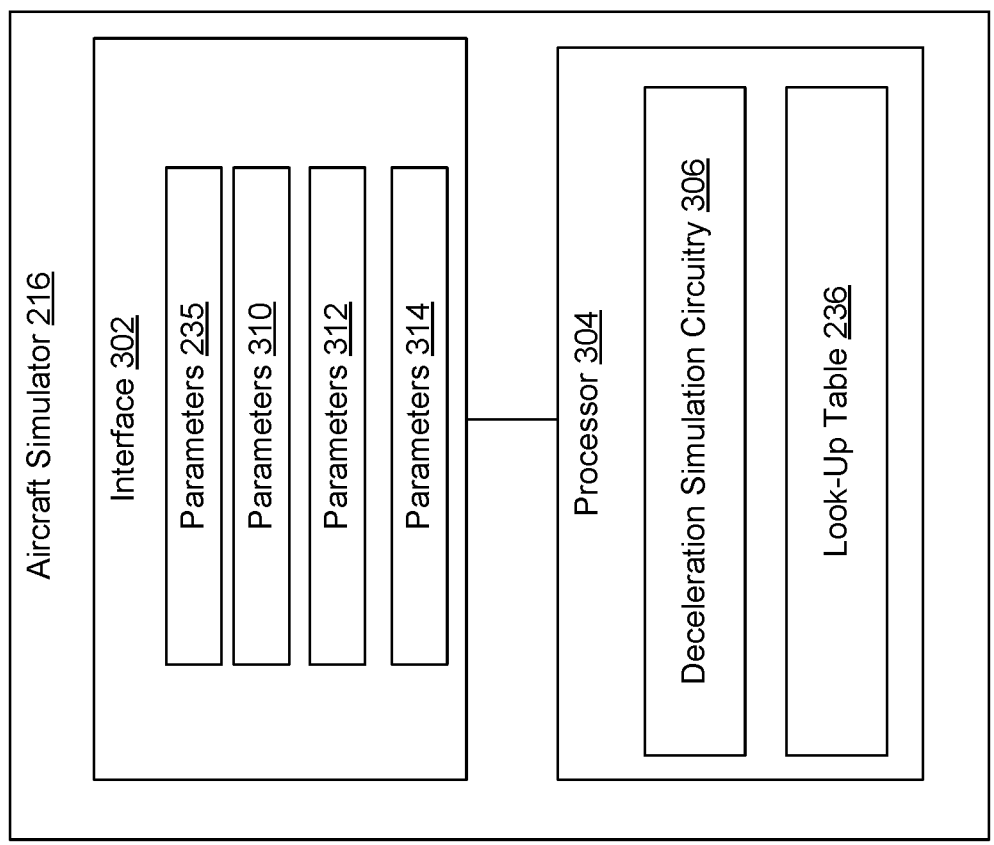
FIG. 2B is a block diagram of an aircraft simulator.

The take-off rejection speed threshold is based on aircraft deceleration simulations performed by an aircraft simulator, as described in greater detail with respect to FIG. 2B. The aircraft simulator uses one or more parameters associated with the aircraft 100 (e.g., a weight of the aircraft 100, wind conditions surrounding the aircraft 100, a coefficient of friction between a wheel of the aircraft 100 and the runway 102, a length of the runway 102, etc.) to simulate a take-off of the aircraft 100. The aircraft simulator performs aircraft deceleration simulations based on the one or more parameters. Based on the aircraft deceleration simulations, the aircraft simulator estimates the maximum aircraft speed (e.g., the take-off rejection speed threshold) the aircraft 100 can reach during the take-off that will enable and the aircraft 100 to safely stop prior to a particular distance 116 from the end 110 of the runway 102.

Thus, according to some implementations, the decision of whether to continue (or discontinue) the take-off is based on whether the aircraft 100 can come to a stop prior to the particular distance 116 from the end 110 of the runway 102. To illustrate, in FIG. 1A, the system 200 determines that the speed of the aircraft 100 exceeds the take-off rejection speed threshold determined during simulation. As a result, in FIG. 1A, the system 200 alerts a pilot of the aircraft 100 to continue the take-off to improve aircraft operation. After the aircraft 100 performs the take-off, the aircraft 100 may circle around to land on the runway 102 or another runway. In FIG. 1B, the system 200 determines that the speed of the aircraft 100 is less than or equal to the take-off rejection speed threshold. As a result, in FIG. 1B, the system 200 alerts to the pilot to discontinue the take-off.

Thus, in FIG. 1A, because the speed of the aircraft 100 exceeds the take-off rejection speed threshold, the aircraft 100 may not be able to come to a stop before the aircraft 100 reaches a position 108 that is the particular distance 116 from the end 110 of the runway 102. However, in FIG. 1B, because the speed of the aircraft 100 fails to exceed the take-off rejection speed threshold, the aircraft 100 is expected to be able to come to a stop before the aircraft 100 reaches the position 108. The particular distance 116 from the end 110 of the runway 102 is used as a safety measure to ensure that the aircraft 100 is able to stop prior to reaching the end 110 of the runway 102. For example, the particular distance 116 acts as a buffer to ensure that, in response to a determination to discontinue the take-off, the aircraft 100 does not travel to the end 110 of the runway 102. According to some implementations, the particular distance 116 is used as a buffer to account for pilot reaction time in applying brakes to stop the aircraft 100, inaccurate aircraft parameters used to determine whether to continue the take-off, etc.

Referring to FIG. 2A, a block diagram of the aircraft 100 is shown. The aircraft 100 includes the system 200, an engine 202 coupled to the system 200, an aircraft display 204 coupled to the system 200, and aircraft deceleration equipment 206 coupled to the system 200. In the implementation illustrated in FIG. 2A, the system 200 includes engine-related event detection circuitry 210, a speed sensor 212, a flight-time tracker 214, a memory 215, a look-up table processor 217, a comparison unit 218, an indication generator 220, and a deceleration initiator 222.

One or more parameters 235 of the aircraft 100 are determined prior to the flight. To illustrate, while the aircraft 100 is at the gate, aircrew determines the one or more parameters 235 of the aircraft 100. The one or more parameters 235 can include a weight 290 of the aircraft 100, a runway length 291 of the runway 102, wind conditions 292 (e.g., a speed and a direction of winds) surrounding the aircraft 100, a runway friction parameter 293 (e.g., a coefficient of friction between wheels of the aircraft 100 and the runway 102), etc. It should be understood that additional (or fewer) parameters can be included in the one or more parameters 235. The aircrew stores the one or more parameters 235 in the memory 215 prior to initiating the take-off using a graphical user interface 203 integrated into the aircraft display or another input mechanism.

After the one or more parameters 235 are stored in the memory 215, the look-up table processor 217 performs a look-up operation based on the one or more parameters 235 to determine (e.g., select) a take-off rejection speed threshold 238 for the aircraft 100, a take-off rejection time threshold 239 for the aircraft 100, or both. For example, a look-up table 236 generated by an aircraft simulator, such as an aircraft simulator 216 illustrated in FIG. 2B, is stored in the memory 215. The aircraft simulator 216 is for a particular aircraft that is similar to the aircraft 100. For example, the aircraft simulator 216 simulates the "source aircraft" (e.g., the aircraft 100) or a similar type of aircraft as the aircraft 100. The look-up table 236 includes take-off rejection speed thresholds for different aircraft parameters, take-off rejection time thresholds for different aircraft parameters, or both, based on aircraft deceleration simulations performed by the aircraft simulator 216. The look-up table processor 217 selects the take-off rejection speed threshold 238, the take-off rejection time threshold 239, or both, from the look-up table 236 that correspond to the one or more parameters 235.

Although a single look-up table 236 is illustrated, in other implementations, multiple look-up tables are stored in the memory 215. For example, the memory 215 may store different look-up tables for different aircraft parameters (e.g., wind speeds, wind directions, runway lengths, weights, etc.). Look-up tables for different pilot reaction times may also be stored in the memory 215. For example, the aircraft simulator 216 may measure reaction times for different pilots. To illustrate, the aircraft simulator 216 may determine how long it takes different pilots to initiate deceleration after receiving an indication to discontinue a take-off. Thus, the look-up table processor 217 may select a particular look-up table (from the multiple look-up tables) stored in the memory 215, and select a take-off rejection speed threshold from the particular look-up table.

The take-off rejection speed threshold 238 indicates a maximum aircraft speed, based on the aircraft deceleration simulations performed by the aircraft simulator 216, that the aircraft 100 can reach during take-off before decelerating and safely stopping prior to the particular distance 116 from the end 110 of the runway 102. For example, if the take-off of the aircraft 100 is similar to a simulated take-off of an aircraft (having the parameters 235) performed by the aircraft simulator 216, the take-off rejection speed threshold 238 corresponds to the maximum aircraft speed that the aircraft 100 can reach while safely stopping prior to the particular distance 116 from the end 110 of the runway 102. The take-off rejection time threshold 239 indicates a maximum amount of time, based on the aircraft deceleration simulations performed by the aircraft simulator 216, which can elapse between initiation of the take-off and initiation of deceleration that enables the aircraft 100 to safely stop prior to the particular distance 116 from the end 110 of the runway 102.

After the take-off rejection speed threshold 238 and the take-off rejection time threshold 239 are selected from the look-up table 236 generated by the aircraft simulator 216, the pilot may initiate take-off of the aircraft 100. For example, the pilot adjusts the throttle of the aircraft 100 to initiate take-off. During take-off, the engine-related event detection circuitry 210 is configured to detect an engine-related event 230 associated with the engine 202. To illustrate with respect to FIGS. 1A-1B, when the aircraft 100 is at the position 104 along the runway 102 during the take-off, the engine-related event detection circuitry 210 detects the engine-related event 230 associated with the engine 202. As described above, the engine-related event 230 is an event or occurrence (at the engine 202) that could result in a suboptimal flight.

After the engine-related event 230 is detected, the system 200 identifies additional information associated with the aircraft 100 for use in determining whether to continue (or discontinue) the take-off. For example, a particular time after detection of the engine-related event 230, the speed sensor 212 identifies a speed 232 of the aircraft 100. To illustrate, the speed sensor 212 identifies the speed 232 of the aircraft 100 when the aircraft 100 is at the position 106 (e.g., the speed 232 of the aircraft 100 shortly after the engine-related event 230 occurs). Additionally, or in the alternative, a flight-time tracker 214 identifies an elapsed time 234 since the aircraft 100 initiated the take-off. For example, the flight-time tracker 214 tracks the amount of time that has elapsed since the pilot adjusted the throttle for take-off and occurrence of the engine-related event 230. The speed 232 of the aircraft 100, the elapsed time 234, or both, are used to generate a recommendation indicating whether to continue the take-off after the engine-related event 230 occurs.

According to an implementation based on the speed 232, the comparison unit 218 is configured to compare the speed 232 of the aircraft 100 to the take-off rejection speed threshold 238. The comparison unit 218 generates comparison results 240 indicating whether the speed 232 of the aircraft 100 is greater than the take-off rejection speed threshold 238. The comparison results 240 are provided to the indication generator 220. The indication generator 220 is configured to generate an indication 242 recommending whether to continue the take-off based on the comparison results 240. For example, the indication 242 recommends to discontinue the take-off if the speed 232 of the aircraft 100 is less than or equal to the take-off rejection speed threshold 238, as illustrated in FIG. 1B. According to one implementation, the aircraft display 204 displays the indication 242, and the pilot of the aircraft 100 applies aircraft deceleration equipment 206 (e.g., brakes) to discontinue the take-off. According to another implementation, the deceleration initiator 222 automatically applies the aircraft deceleration equipment 206 to discontinue the take-off in response to the indication 242 recommending discontinuance of the take-off. As another example, the indication 242 recommends to continue the take-off if the speed 232 of the aircraft 100 is greater than the take-off rejection speed threshold 238, as illustrated in FIG. 1A.

According to an implementation based on the elapsed time 234, the comparison unit 218 is configured to compare the elapsed time 234 to the take-off rejection time threshold 239. The comparison unit 218 generates comparison results 240 indicating whether the elapsed time 234 since initiation of the take-off is greater than the take-off rejection time threshold 239. The comparison results 240 are provided to the indication generator 220. The indication generator 220 is configured to generate the indication 242 recommending whether to continue the take-off based on the comparison results 240. For example, the indication 242 recommends to discontinue the take-off if the elapsed time 234 is less than or equal to the take-off rejection time threshold 239, as illustrated in FIG. 1B. As another example, the indication 242 recommends to continue the take-off if the elapsed time 234 is greater than the take-off rejection time threshold 239, as illustrated in FIG. 1A.

According to one implementation, the indication 242 is a visual alert that indicates whether to continue the take-off. To illustrate, the visual alert may be displayed on the aircraft display 204. According to another implementation, the indication 242 is an audio alert (e.g., a verbal audio alert or a non-verbal audio alert). According to another indication, the indication 242 includes flashing lights within the cockpit of the aircraft 100. For example, a green flashing light within the cockpit indicates to continue the take-off and a red flashing light within the cockpit indicates to discontinue the take-off.

The techniques described with respect to FIGS. 2A enable the system 200 to recommend whether to continue (or discontinue) the take-off after the engine-related event 230 is detected. The recommendation to continue the take-off is made if the speed 232 of the aircraft 100 is greater than the take-off rejection speed threshold 238. For example, the system 200 recommends continuance of the take-off because, based on simulations performed by the aircraft simulator 216, the aircraft 100 is not able to stop prior to reaching the particular distance 116 from the end 110 of the runway 102. The recommendation to discontinue the take-off is made if the speed 232 of the aircraft 100 is less than or equal to the take-off rejection speed threshold. For example, the system 200 recommends discontinuance of the take-off because, based on simulations performed by the aircraft simulator 216, the aircraft 100 is able to stop prior to reaching the particular distance 116 from the end 110 of the runway 102.

According to some implementations, the speed 232 of the aircraft 100 is continually monitored as the aircraft 100 accelerates towards a take-off speed. Based on monitoring the speed 232, the indication 242 may change from recommending discontinuance of the take-off to recommending continuance of the take-off if the pilot has not applied the aircraft deceleration equipment 206 in a timely manner. For example, if the pilot delays applying the aircraft deceleration equipment 206 while the speed 232 is below the take-off rejection speed threshold 238, the speed 232 may exceed the take-off rejection speed threshold 238 and the indication 242 may recommend continuance of the take-off.

Referring to FIG. 2B, the aircraft simulator 216 is shown. The aircraft simulator 216 is configured to generate the look-up table 236 prior to the aircraft 100 initiating take-off. The aircraft simulator 216 includes an interface 302 and a processor 304 coupled to the interface 302.

The interface 302 is configured to receive different sets of aircraft parameters. For example, the interface 302 receives the one or more parameters 235 associated with the aircraft 100, a set of aircraft parameters 310, a set of aircraft parameters 312, and a set of aircraft parameters 314. Each set of aircraft parameters 310-314 is unique. For example, each set of aircraft parameters 310-314 includes a unique combination of an aircraft weight, a runway length, wind conditions, a pilot reaction time, runway friction parameters, etc. Although four sets of aircraft parameters 235, 310, 312, 314 are illustrated in FIG. 2B, in other implementations, additional (or fewer) sets of aircraft parameters are provided to the aircraft simulator 216. As a non-limiting example, thousands of unique sets of aircraft parameters may be provided to the aircraft simulator 216. According to one implementation, simulation for particular sets of aircraft parameters may be performed multiple times to generate more than one data point for a set of aircraft parameters.

The processor 304 includes deceleration simulation circuitry 306. The deceleration simulation circuitry 306 is configured to perform aircraft deceleration simulations for each set of aircraft parameters 235, 310, 312, 314. The aircraft deceleration simulations are used to estimate a maximum aircraft speed that would enable an aircraft, having a corresponding set of aircraft parameters, to stop prior to a particular distance from an end of an associated runway. According to another implementation, the length of the particular distance (e.g., the particular distance 116) is industry-regulated. As a non-limiting example, the Federal Aviation Administration (FAA) sets the length of the particular distance to ensure an adequate buffer for pilots when determining whether to continue a take-off. The processor 304 (or another computing device) is configured to generate the look-up table 236 based on the aircraft deceleration simulations. The look-up table 236 has a plurality of aircraft speeds, and each aircraft speed of the plurality of aircraft speeds indicates the maximum aircraft speed for the corresponding set of aircraft parameters. Additionally, or in the alternative, a look-up table has a plurality of times (e.g., take-off rejection time thresholds) that are indexed by aircraft parameters.

Figure 2C:
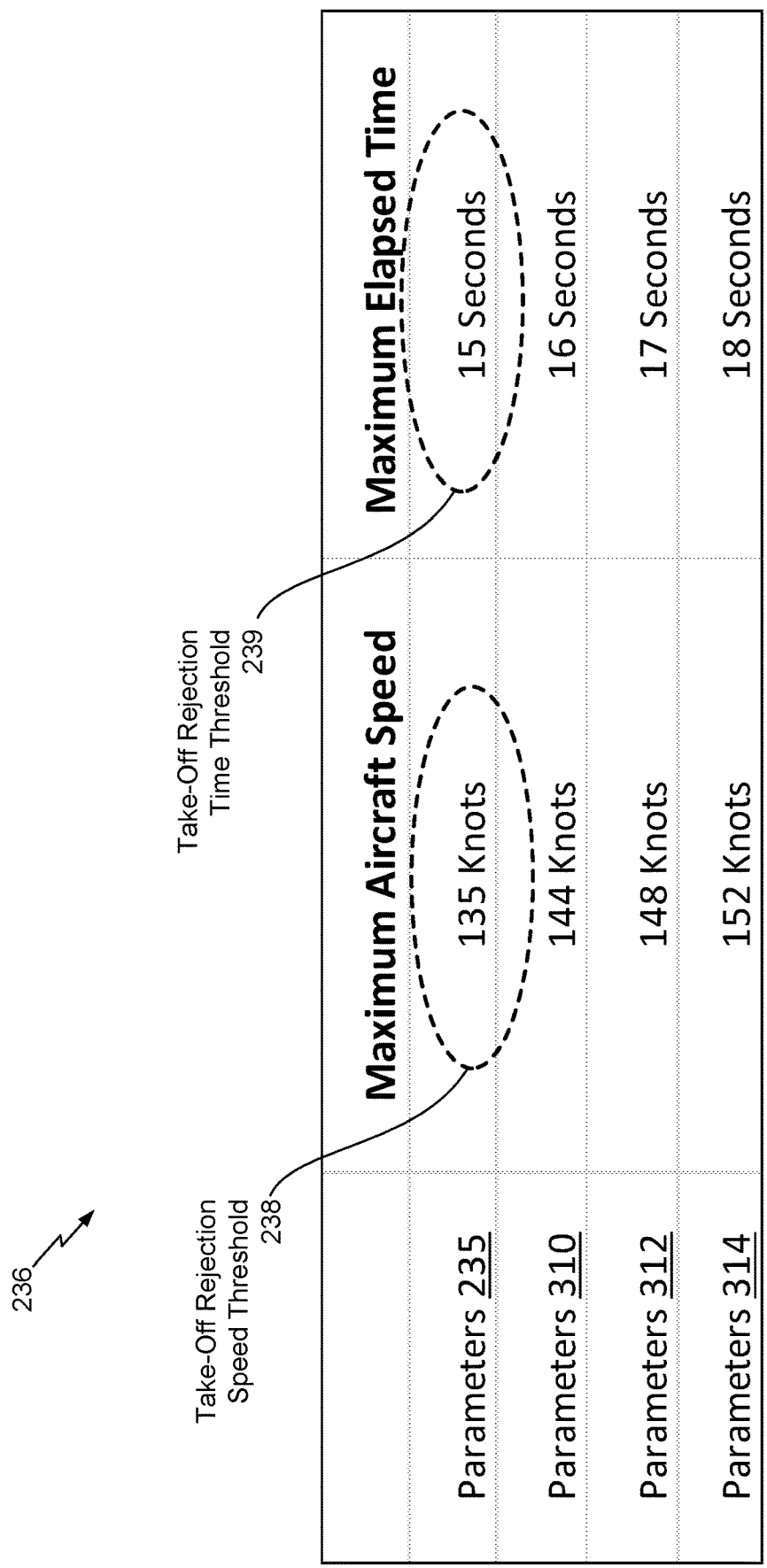
FIG. 2C depicts a look-up table generated by the aircraft simulator.

Referring to FIG. 2C, an example of the look-up table 236 is shown. The look-up table 236 indicates a maximum aircraft speed of 135 knots for the parameters 235. Thus, in the illustrated example of FIGS. 1A-2B, the take-off rejection speed threshold 238 is equal to 135 knots. Therefore, if the speed 232 of the aircraft 100 exceeds 135 knots during the take-off, the system 200 recommends continuance of the take-off, as shown in FIG. 1A. However, if the speed 232 of the aircraft 100 fails to exceed 135 knots prior to the engine-related event 230, the system 200 recommends discontinuance of the take-off, as shown in FIG. 1B.

Referring back to FIG. 2B, the deceleration simulation circuitry 306 is also, or in the alternative, configured to determine a maximum elapsed time (between take-off initiation and initiation of deceleration) that would enable an aircraft, having the parameters 235, to stop prior to the particular distance from an end of an associated runway. Thus, the look-up table 236 also indicates, or alternatively indicates, a plurality of times. Each time of the plurality of times indicates the maximum elapsed time (between take-off initiation and initiation of deceleration), for the corresponding set of aircraft parameters, that would enable an aircraft to stop prior to the particular distance from an end of an associated runway.

For example, referring back to FIG. 2C, the look-up table 236 indicates a maximum elapsed time of 15 seconds for the parameters 235. Thus, in the illustrated example of FIGS. 1A-2B, the take-off rejection time threshold 239 is equal to 15 seconds. Therefore, if the elapsed time 234 prior to the engine-related event 230 exceeds 15 seconds, the system 200 recommends continuance of the take-off, as shown in FIG. 1A. However, if the elapsed time 234 prior to the engine-related event 230 fails to exceed 15 seconds, the system 200 recommends discontinuance of the take-off, as shown in FIG. 1B.

According to the look-up table 236, the maximum aircraft speed for an aircraft having the parameters 310 is 144 knots, and the maximum elapsed time for the aircraft having the parameters 310 is 16 seconds. According to the look-up table 236, the maximum aircraft speed for an aircraft having the parameters 312 is 148 knots, and the maximum elapsed time for the aircraft having the parameters 312 is 17 seconds. According to the look-up table 236, the maximum aircraft speed for an aircraft having the parameters 314 is 152 knots, and the maximum elapsed time for the aircraft having the parameters 314 is 18 seconds.

The techniques described with respect to FIGS. 2B and 2C enable the aircraft simulator 216 (or another computing device) to generate the look-up table 236 (based on aircraft deceleration simulations) used by the system 200. Based on the look-up table 236, the system 200 can recommend whether to continue (or discontinue) the take-off after the engine-related event 230 is detected.

Figure 3:
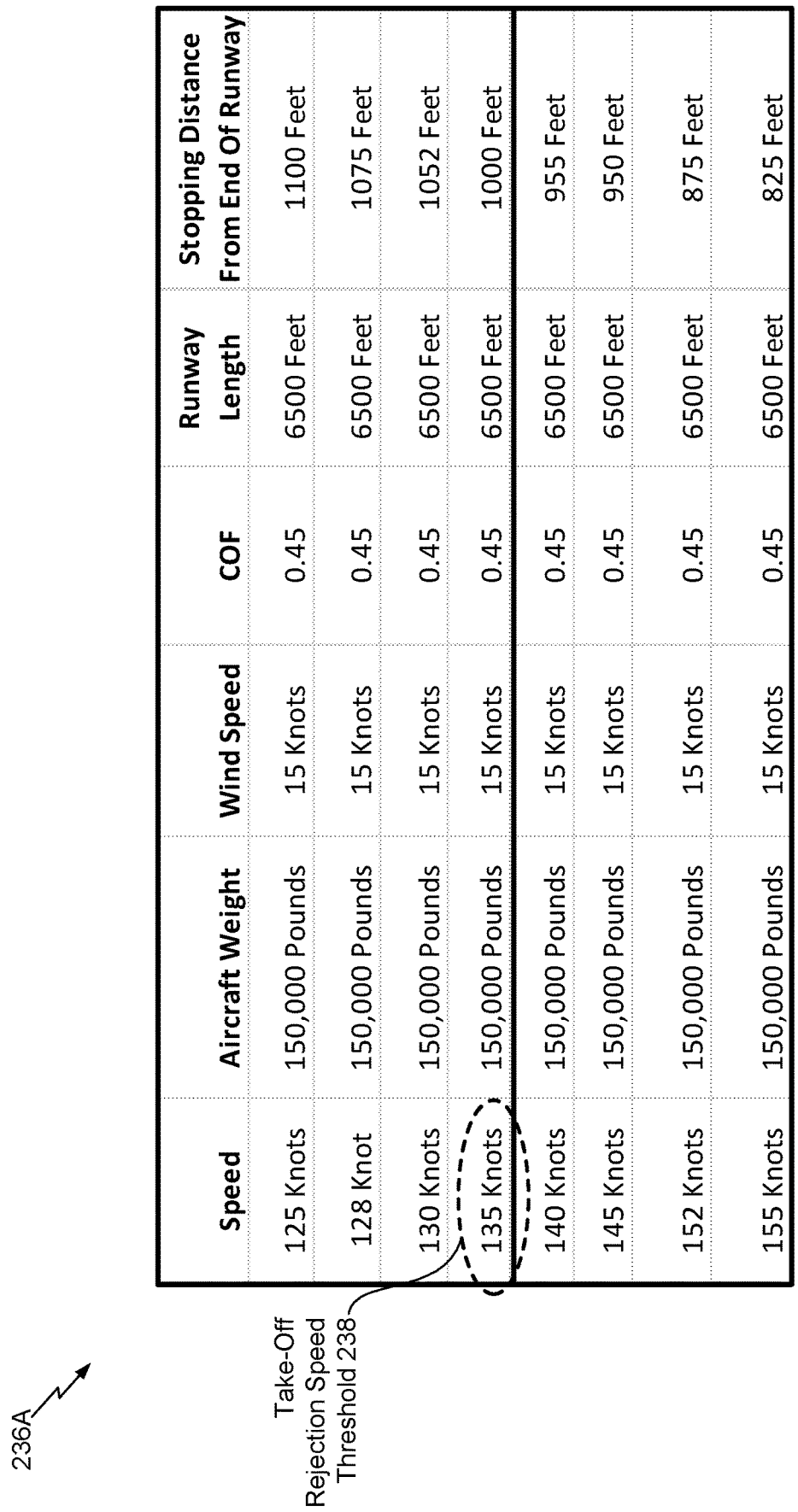
FIG. 3 depicts another look-up table generated by the aircraft simulator.

Referring to FIG. 3, another example of a look-up table 236A is shown. According to one implementation, the look-up table 236A is generated by the aircraft simulator 216 (or another computing device) based on the parameters 235. For example, the weight 290 of the aircraft 100 is 150,000 pounds, the wind speed (e.g., the wind conditions 292) surrounding the aircraft is 15 knots, the coefficient of friction (COF) (e.g., the runway friction parameter 293) between wheels of the aircraft 100 and the runway 102 is equal to 0.45, and the runway length 291 of the runway 102 is equal to 6500 feet.

The look-up table 236A indicates stopping distances from an end of the runway. The stopping distances are determined by the aircraft simulator 216 during aircraft deceleration simulations and are based on a maximum speed and a location on the runway reached by an aircraft (having the parameters 235) after the engine event and before deceleration is initiated. Assuming that the particular distance 116 is equal to 1000 feet, the look-up table 236A can be used to identify the take-off rejection speed threshold 238.

According to the look-up table 236A, if the aircraft 100 reaches a maximum speed of 125 knots (where an engine event occurs during take-off) before the aircraft deceleration equipment 206 is applied, the aircraft 100 will stop 1100 feet before the end 110 of the runway 102 (based on deceleration simulations using identified aircraft parameters). Because the stopping distance of 1100 feet is greater than the particular distance 116, the look-up table processor 217 determines that the aircraft speed of 125 knots is a potential candidate to be the take-off rejection speed threshold 238. According to the look-up table 236A, if the aircraft 100 reaches a maximum speed of 128 knots during take-off before the aircraft deceleration equipment 206 is applied, the aircraft 100 will stop 1075 feet before the end 110 of the runway 102. Because the stopping distance of 1075 feet is greater than the particular distance 116, the look-up table processor 217 determines that the aircraft speed of 128 knots is a potential candidate to be the take-off rejection speed threshold 238. According to the look-up table 236A, if the aircraft 100 reaches a maximum speed of 130 knots during take-off before the aircraft deceleration equipment 206 is applied, the aircraft 100 will stop 1052 feet before the end 110 of the runway 102. Because the stopping distance of 1052 feet is greater than the particular distance 116, the look-up table processor 217 determines that the aircraft speed of 130 knots is a potential candidate to be the take-off rejection speed threshold 238. According to the look-up table 236A, if the aircraft 100 reaches a maximum speed of 135 knots during take-off before the aircraft deceleration equipment 206 is applied, the aircraft 100 will stop 1000 feet before the end 110 of the runway 102. Because the stopping distance of 1000 feet is equal to the particular distance 116, the look-up table processor 217 determines that the aircraft speed of 135 knots is the best candidate to be the take-off rejection speed threshold 238.

According to the look-up table 236A, because aircrafts (with the parameters 235 including aircraft weight, wind speed and other parameters) having a maximum speed above 135 knots during take-off will stop less than 1000 feet from the end 110 of the runway 102, aircraft speeds greater than 135 knots are not candidates for the take-off rejection speed threshold 238, such that a pilot should not discontinue take-off and should instead continue take-off to avoid traveling beyond the end of the runway. Accordingly, where an aircraft detects an engine-related event 230 during take-off, the system 200 can identify from the speed sensor 212 a present speed 232 of the aircraft 100 and a particular elapsed time since the aircraft initiated take-off (from which to determine a location on the runway of the aircraft), for comparison to a take-off rejection speed threshold and stopping distance in the look-up table 236A for determining whether to continue (or discontinue) the take-off. For example, at some time after detection of the engine-related event 230, the speed sensor 212 identifies the speed 232 of the aircraft 100 when the aircraft 100 is at the position 106 (e.g., the speed 232 of the aircraft 100 shortly after the engine-related event 230 occurs), and the system compares the identified speed to a particular look-up table take-off rejection speed threshold (corresponding to aircraft parameters) to determine if the indicated/identified speed is respectively greater than or less than the take-off rejection speed threshold. The system then displays on an aircraft display a recommendation of 'Continue Take-Off' if the aircraft speed is greater than a look-up table take-off rejection speed threshold of 135 knots that would result in the aircraft stopping less than a predetermined safety distance of 1000 feet from the end of the runway, as in the above example, or alternatively displays a recommendation of 'Reject Take-off' if the aircraft speed is less than the look-up table take-off rejection speed threshold that would result in the aircraft stopping more than a predetermined safety distance of 1,000 feet from the end of the runway.

It should be understood that the aircraft simulator 216 can generate a plurality of different look-up tables based on a plurality of different parameters (e.g., aircraft parameters, runway parameters, wind parameters, etc.). The look-up tables can indicate take-off rejection speed thresholds, take-off rejection time thresholds, or other take-off rejection parameters.

Figure 4:
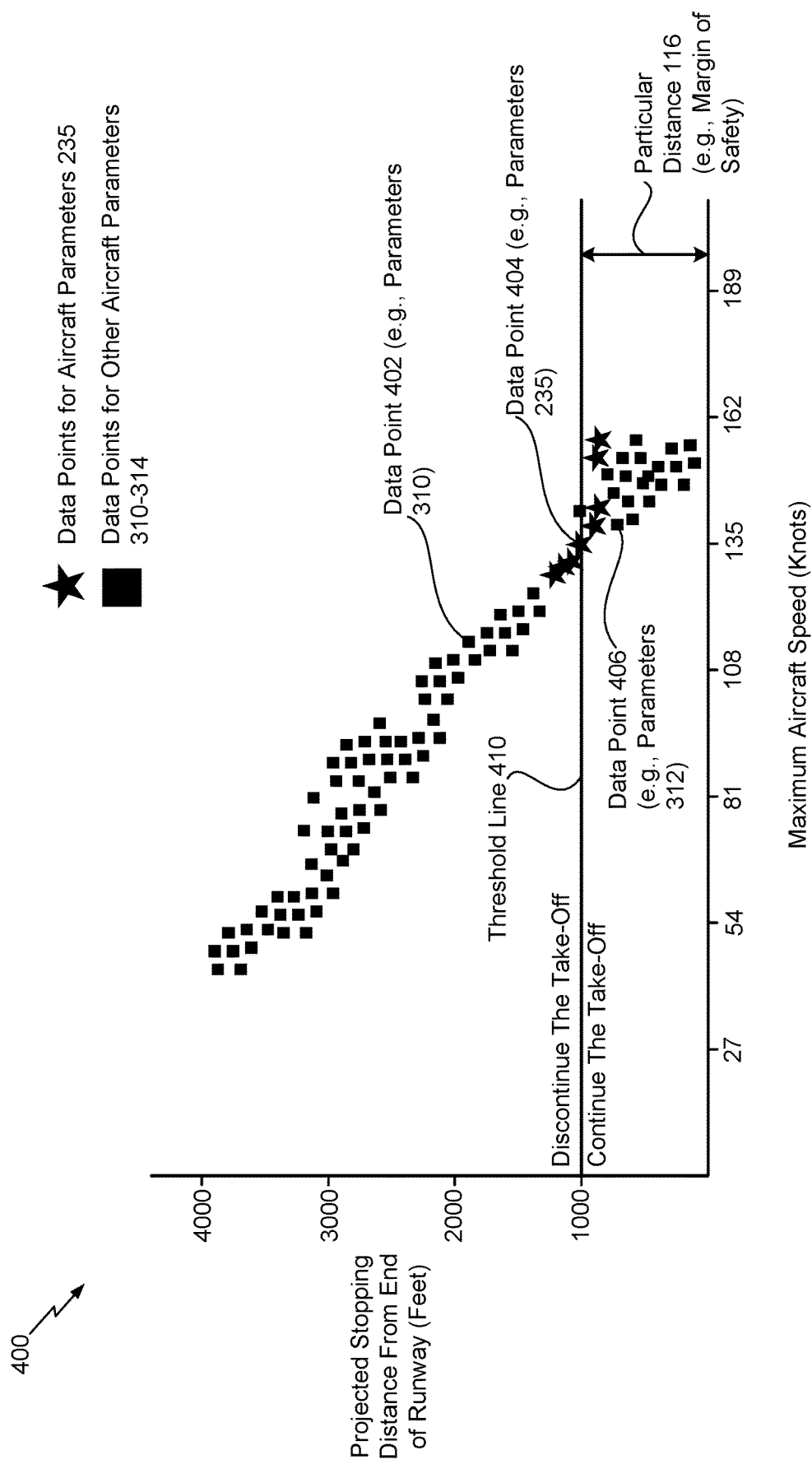
FIG. 4 depicts a chart that illustrates a correlation between aircraft speeds and projected stopping distances from an end of a runway if deceleration equipment is applied.

Referring to FIG. 4, a chart 400 that illustrates a correlation between aircraft speeds and projected stopping distances from an end of a runway if deceleration equipment is applied. In the chart 400, data points having a star shape correspond to entries in the look-up table 236A (e.g., entries having the parameters 235), and data points having a square shape correspond to other entries associated with the parameters 310, 312, 144 in the look-up table 236.

The chart 400 includes a threshold line 410 corresponding to the particular distance 116 from an end of a runway associated with the respective parameters. According to the example provided herein, the particular distance 116 from the end of the runway is 1000 feet. Aircrafts represented by data points below the threshold line 410 are advised to continue take-off if an engine-related event occurs, and aircrafts represented by data points on or above the threshold line 410 are advised to discontinue take-off if an engine-related event occurs.

For example, a data point 402 corresponds to an aircraft (having the parameters 310) reaching a maximum speed of 113 knots. The projected stopping distance from the end of the associated runway for the data point 402 is 1800 feet. Because the data point 402 is above the threshold line 410, the aircraft (having the parameters 310) reaching a maximum speed of 113 knots should discontinue take-off if an engine-related event occurs. In this example, at some time after detection of the engine-related event 230, the system may identify the elapsed time since the aircraft initiated take-off, and the speed sensor 212 identifies the speed 232 of the aircraft 100 when the aircraft 100 is at the position 106 (e.g., the speed of the aircraft 100 shortly after the engine-related event 230 occurs), where the system compares the identified speed to a particular look-up table take-off rejection speed threshold (corresponding to aircraft parameters) to determine if the identified speed of 113 knots is less than the take-off rejection speed threshold that would result in the aircraft stopping with more than a predetermined safety distance of 1000 feet from the end of the runway, and responsively displays a recommendation of 'Reject Take-off' where the aircraft speed is less than the look-up table take-off rejection speed.

As another example, a data point 404 corresponds to an aircraft (having the parameters 235) reaching a maximum speed of 135 knots. The projected stopping distance from the end of the associated runway for the data point 404 is 1000 feet. Because the data point 404 is on the threshold line 410, the aircraft (having the parameters 235) reaching a maximum speed of 135 knots should discontinue the take-off if an engine-related event occurs.

As another example, a data point 406 corresponds to an aircraft (having the parameters 312) reaching a maximum speed of 138 knots. The projected stopping distance from the end of the associated runway for the data point 406 is 800 feet. Because the data point 406 is below the threshold line 410, the aircraft (having the parameters 312) reaching a maximum speed of 138 knots should continue the take-off if an engine-related event occurs. In this example, at some time after detection of the engine-related event 230, the system may identify the elapsed time since the aircraft initiated take-off, and the speed sensor 212 identifies the speed 232 of the aircraft 100 when the aircraft 100 is at the position 106 (e.g., the speed of the aircraft 100 shortly after the engine-related event 230 occurs), where the system compares the identified speed to a particular look-up table take-off rejection speed threshold (corresponding to aircraft parameters) to determine if the identified speed of 138 knots is greater than the take-off rejection speed threshold that would result in the aircraft stopping with less than a predetermined safety distance from the end of the runway, and responsively displays a recommendation of 'Continue Take-off' where the aircraft speed is greater than the look-up table take-off rejection speed.

Additionally, the aircraft 100 may further comprise a forward-facing camera 208 coupled to an image processor 209. The forward-facing camera 208 is configured to detect objects, obstructions or conditions on the runway 102 ahead of the aircraft 100 from the images, and estimate a runway distance remaining to the detected object to be used in calculating a revised runway length up to the object location. For example, the forward-facing camera 208 and images could identify an airport support vehicle or even an animal that may have inadvertently moved onto the runway 102 ahead of the aircraft 100, for use in estimating a runway distance remaining to the detected object. With this revised runway length, the system 200 compares the aircraft's speed to a particular look-up table take-off rejection speed threshold (corresponding to aircraft parameters and revised runway length) to determine if the aircraft speed is respectively greater than or less than the take-off rejection speed threshold, and then displays on an aircraft display a recommendation of 'Continue Take-Off' if the aircraft speed is greater than a look-up table take-off rejection speed threshold that would result in the aircraft not stopping before the detected object, or a recommendation of 'Reject Take-off' if the aircraft speed is less than the look-up table take-off rejection speed threshold that would result in the aircraft stopping more than a predetermined safety distance from the detected object on the runway.

Figure 5:
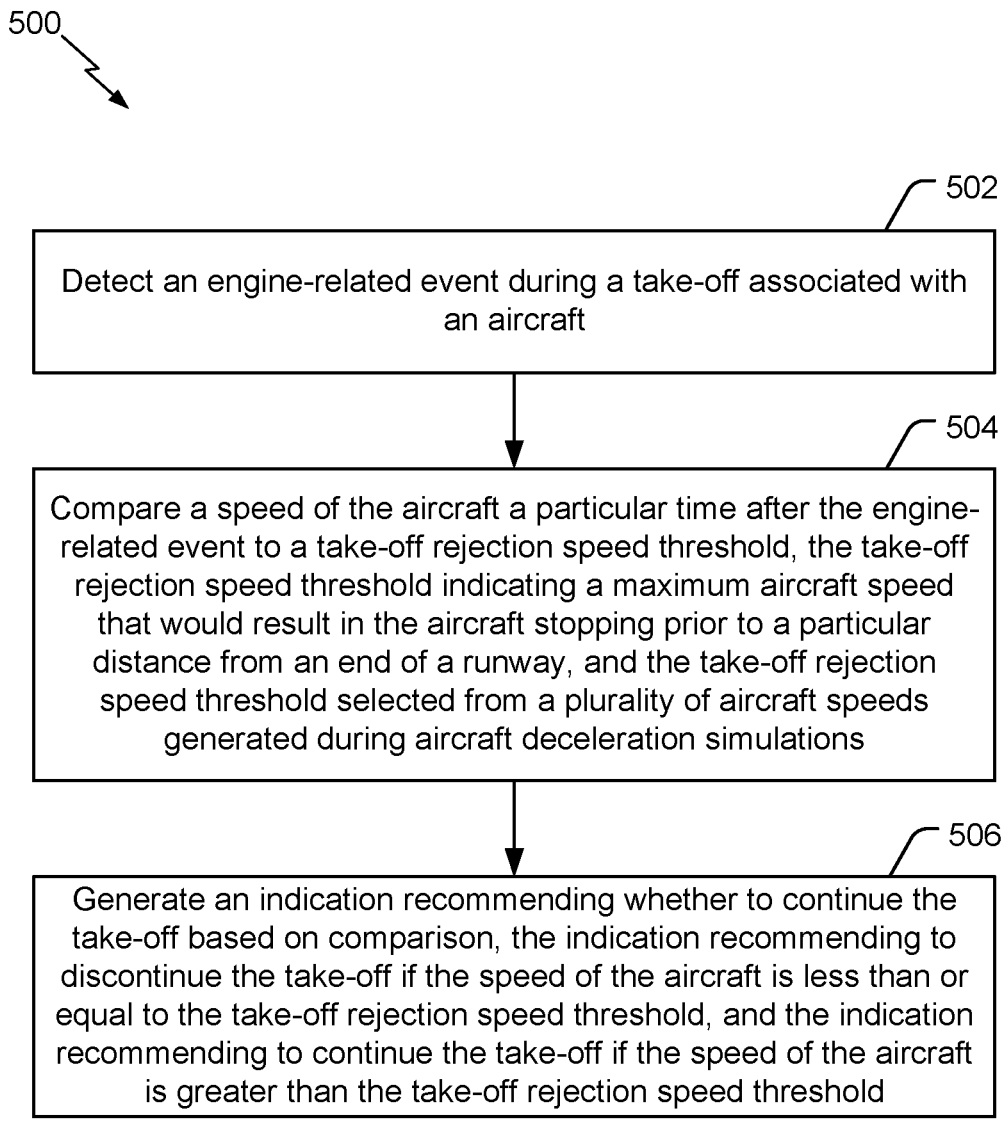
FIG. 5 is a flow chart of a method for generating a recommendation during a take-off associated with an aircraft.

Referring to FIG. 5, a method 500 for generating a recommendation during a take-off associated with an aircraft is shown. The method 500 is performed by the one or more components of the aircraft 100.

The method 500 includes detecting an engine-related event during a take-off associated with an aircraft, at 502. For example, the engine-related event detection circuitry 210 detects the engine-related event 230 associated with the engine 202. To illustrate with respect to FIGS. 1A-1B, when the aircraft 100 is at the position 104 along the runway 102 during the take-off, the engine-related event detection circuitry 210 detects the engine-related event 230 associated with the engine 202. As described above, the engine-related event 230 is an event or occurrence (at the engine 202) that could result in a suboptimal flight.

The method 500 also includes comparing a speed of the aircraft a particular time after the engine-related event to a take-off rejection speed threshold, at 504. The take-off rejection speed threshold indicates a maximum aircraft speed that would result in the aircraft stopping prior to a particular distance from an end of a runway, and the take-off rejection speed threshold is selected from a plurality of aircraft speeds generated during aircraft deceleration simulations based on particular aircraft parameters. For example, the comparison unit 218 compares the speed 232 of the aircraft 100 to the take-off rejection speed threshold 238. The comparison unit 218 generates comparison results 240 indicating whether the speed of the aircraft 100 is greater than the take-off rejection speed threshold 238.

The method 500 also includes generating an indication recommending whether to continue the take-off based on the comparison, at 506. The indication recommends to discontinue the take-off if the speed of the aircraft is less than or equal to the take-off rejection speed threshold, and the indication recommends to continue the take-off if the speed of the aircraft is greater than the take-off rejection speed threshold. For example, the indication generator 220 generates the indication 242 recommending whether to continue the take-off based on the comparison results 240. The indication 242 recommends to discontinue the take-off if the speed 232 of the aircraft 100 is less than or equal to the take-off rejection speed threshold 238. The indication 242 recommends continuance of the take-off if the speed 232 of the aircraft 100 is greater than the take-off rejection speed threshold 238. Additionally, the method may further comprise processing images from a forward-facing camera on the aircraft to detect objects, obstructions or conditions on the runway ahead of the aircraft, and estimate a runway distance remaining to the detected object, to be used in calculating a revised runway length up to the object location, where the system compares the aircraft's speed to a particular look-up table take-off rejection speed threshold (corresponding to aircraft parameters and revised runway length) to determine if the aircraft speed is respectively greater than or less than the take-off rejection speed threshold, and then displays on an aircraft display a recommendation of 'Continue Take-Off' if the aircraft speed is greater than a look-up table take-off rejection speed threshold that would result in the aircraft not stopping before the detected object, or a recommendation of 'Reject Take-off' if the aircraft speed is less than the look-up table take-off rejection speed threshold that would result in the aircraft stopping more than a predetermined safety distance from the detected object on the runway.

According to one implementation, the method 500 includes determining the speed to the aircraft a particular time after the engine-related event. For example, the speed sensor 212 identifies the speed 232 of the aircraft 100 a particular time after detection of the engine-related event 230. To illustrate, the speed sensor 212 identifies the speed 232 of the aircraft 100 when the aircraft 100 is at the position 106.

According to one implementation, the method 500 includes selecting the take-off rejection speed threshold 238 by accessing the look-up table 236. The look-up table 236 has a plurality of aircraft speeds, and each aircraft speed of the plurality of aircraft speeds is associated with different aircraft parameters 235, 310, 312, 314. The method 500 also includes performing a table look-up operation to select the take-off rejection speed threshold 238. For example, the look-up table processor 217 provides the parameters 235 of the aircraft 100 as an input to the look-up table 236 to identify a particular aircraft speed (e.g., 135 knots) associated with the parameters 235. Additionally, the look-up table processor 217 selects the particular aircraft speed as the take-off rejection speed threshold 238.

According to one implementation, the method 500 includes displaying the indication on an aircraft display of the aircraft. For example, the aircraft display 204 may display the indication 242. According to one implementation, the method 500 includes initiating deceleration of the aircraft in response to a determination that the indication recommends to discontinue the take-off. For example, the deceleration initiator 222 may initiate deceleration of the aircraft 100 in response to a determination that the indication 242 recommends to discontinue the take-off.

The method 500 of FIG. 5 enables a recommendation to be made that indicates whether to continue (or discontinue) the take-off after the engine-related event 230 is detected at the position 104. The recommendation to continue the take-off is made if the speed 232 of the aircraft 100 is greater than the take-off rejection speed threshold 238. For example, the system 200 recommends continuance of the take-off because, based on simulation, the aircraft 100 is not able to stop prior to reaching the particular distance 116 from the end 110 of the runway 102. The recommendation to discontinue the take-off is made if the speed 232 of the aircraft 100 is less than or equal to the take-off rejection speed threshold. For example, the system 200 recommends discontinuance of the take-off because, based on simulation, the aircraft 100 is able to stop prior to reaching the particular distance 116 from the end 110 of the runway 102.

Figure 6:
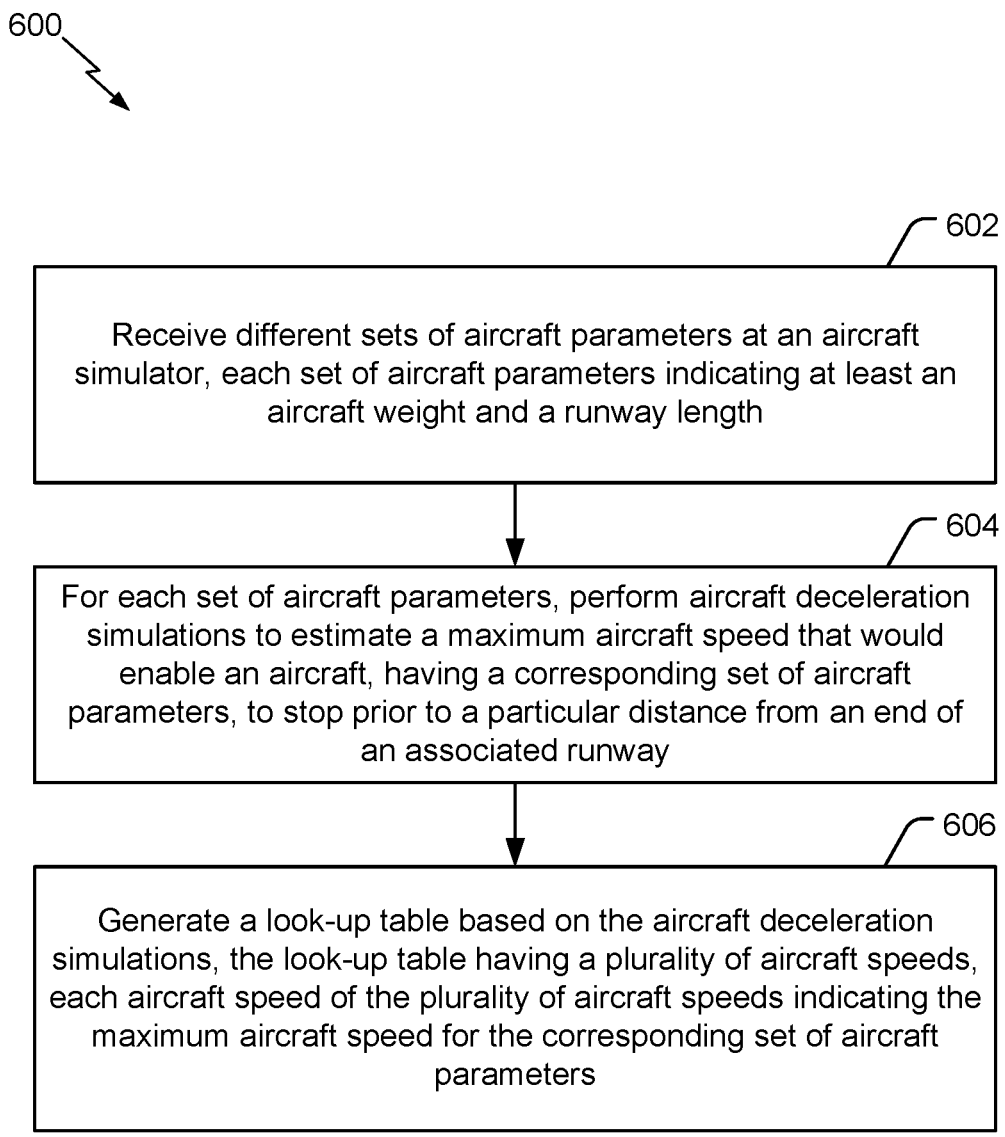
FIG. 6 is a flow chart of a method for generating a look-up table.

Referring to FIG. 6, a method 600 for generating a look-up table is shown. The method 600 is performed by the aircraft simulator 216.

The method 600 includes receiving different sets of aircraft parameters at an aircraft simulator, at 602. Each set of aircraft parameters indicate at least an aircraft weight and a runway length. For example, referring to FIG. 2B, the aircraft simulator 216 receives the set of parameters 235, the set of parameters 310, the set of parameters 312, and the set of parameters 314. Each set of parameters 235, 310, 312, 314 indicate at least an aircraft weight and a runway length. According to one implementation, at least one set of parameters 235, 310, 312, 314 also indicates corresponding wind conditions, a corresponding runway friction parameter, pilot reaction times indexed by pilot identifications, etc.

The method 600 also includes, for each set of aircraft parameters, performing aircraft deceleration simulations to estimate a maximum aircraft speed that would enable an aircraft, having a corresponding set of aircraft parameters, to stop prior to a particular distance from an end of an associated runway, at 604. For example, referring to FIG. 2B, the deceleration simulation circuitry 306 performs aircraft deceleration simulations for each set of aircraft parameters 235, 310, 312, 314 to estimate a maximum aircraft speed that would enable an aircraft, having the corresponding set of parameters 235, 310, 312, 314, to stop prior to 1000 feet from an end of an associated runway.

The method 600 also includes generating a look-up table based on the aircraft deceleration simulations, at 606. The look-up table has a plurality of aircraft speeds, and each aircraft speed of the plurality of aircraft speeds indicates the maximum aircraft speed for the corresponding set of aircraft parameters. For example, the aircraft simulator 216 generates the look-up table 236 in FIG. 2C.

The method 600 of FIG. 6 enables the aircraft simulator 216 or another computing device to generate the look-up table 236 based on aircraft deceleration simulations. Based on the look-up table 236, the look-up table processor 217 can select the take-off rejection speed threshold 238 that enables the system 200 to make a recommendation indicating whether to continue (or discontinue) the take-off after the engine-related event 230. The recommendation to continue the take-off is made if the speed 232 of the aircraft 100 is greater than the take-off rejection speed threshold 238. For example, the system 200 recommends continuance of the take-off because, based on simulation, the aircraft 100 is not able to stop prior to reaching the particular distance 116 from the end 110 of the runway 102. The recommendation to discontinue the take-off is made if the speed 232 of the aircraft 100 is less than or equal to the take-off rejection speed threshold. For example, the system 200 recommends discontinuance of the take-off because, based on simulation, the aircraft 100 is able to stop prior to reaching the particular distance 116 from the end 110 of the runway 102. Thus, the method 600 enables a fast response time (to the engine-related event 230) for generating the recommendation because although the recommendation is based on multiple parameters (e.g., aircraft weight, runway length, etc.), only a single parameter (e.g., the take-off rejection speed threshold 238) is used to perform the look-up after the engine-related event 230.

Figure 7:
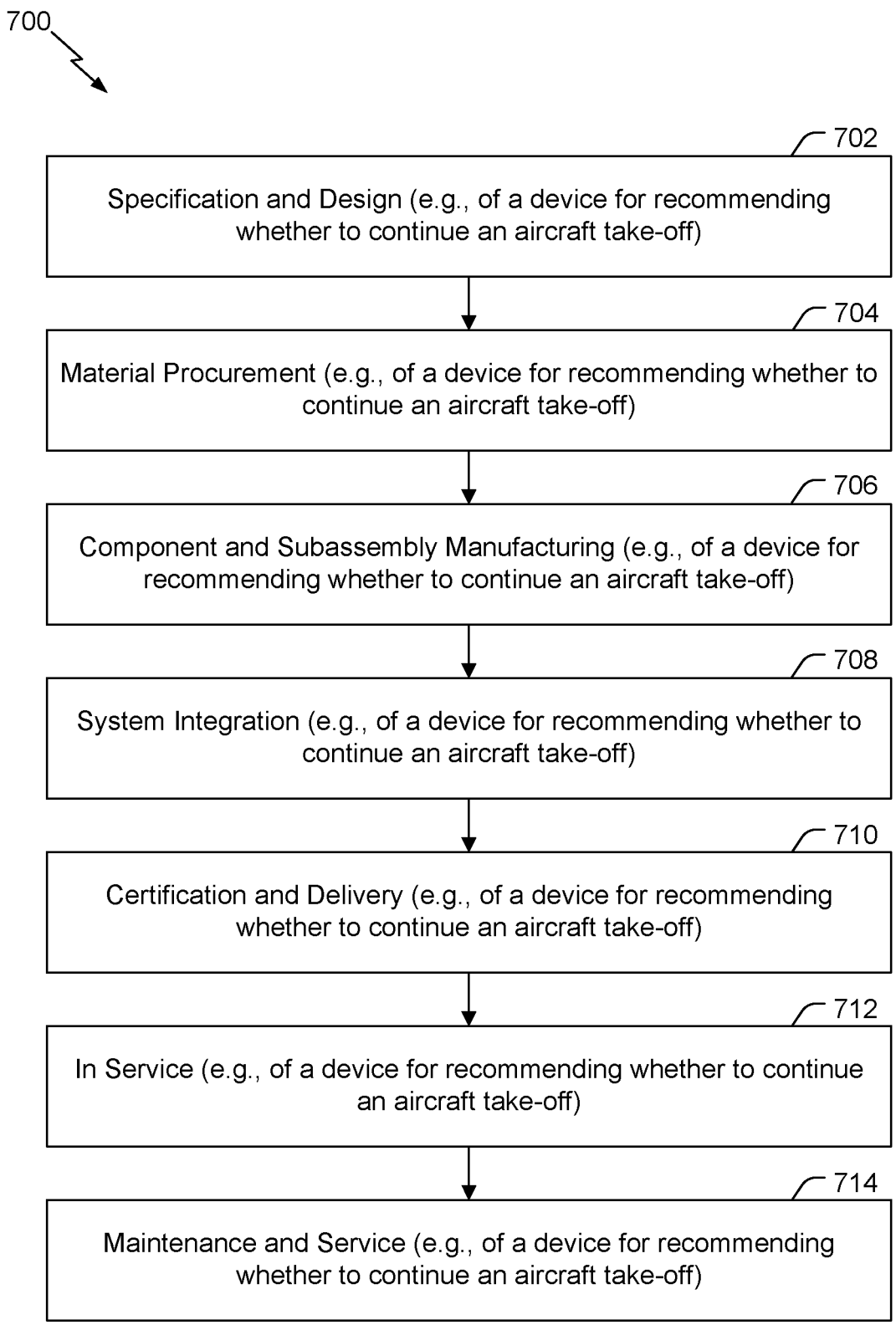
FIG. 7 is a flow chart of a method associated with an aircraft take-off recommendation system.
Figure 8:
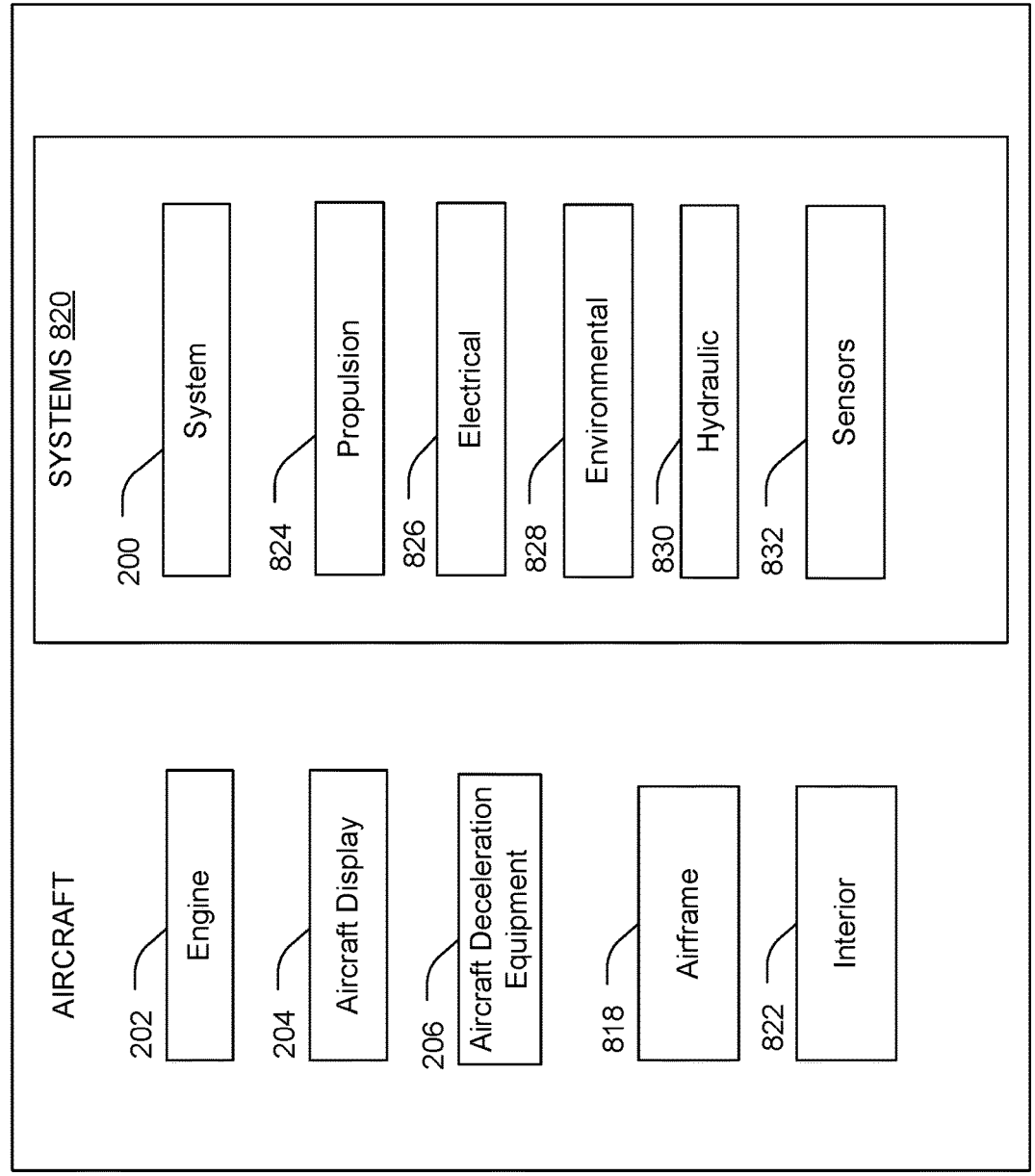
FIG. 8 is a block diagram of an aircraft including an aircraft take-off recommendation system.

Referring to FIGS. 7 and 8, examples of the disclosure are described in the context of an aircraft manufacturing and service method 700 as illustrated by the flow chart of FIG. 7 and the aircraft 100 as illustrated by the block diagram of FIG. 8.

Referring to FIG. 7, a flowchart of an illustrative example of a method associated with an aircraft take-off recommendation system (e.g., the system 200) is shown and designated 700. During pre-production, the exemplary method 700 includes, at 702, specification and design of an aircraft, such as the aircraft 100. During the specification and design of the aircraft, the method 700 includes specifying the system 200, the engine 202, the aircraft display 204, and the aircraft deceleration equipment 206. At 704, the method 700 includes material procurement. For example, the method 700 may include procuring materials (such as materials for the system 200, the engine 202, the aircraft display 204, and the aircraft deceleration equipment 206) for the aircraft take-off recommendation system.

During production, the method 700 includes, at 706, component and subassembly manufacturing and, at 708, system integration of the aircraft. The method 700 may include component and subassembly manufacturing (e.g., the system 200, the engine 202, the aircraft display 204, and the aircraft deceleration equipment 206) of the aircraft take-off recommendation system and system integration (e.g., coupling the components) of the aircraft take-off recommendation system. At 710, the method 700 includes certification and delivery of the aircraft and, at 712, placing the aircraft in service. In some implementations, certification and delivery includes certifying the aircraft take-off recommendation system. Placing the aircraft in service may also include placing aircraft take-off recommendation system in service. While in service, the aircraft may be scheduled for routine maintenance and service (which may also include modification, reconfiguration, refurbishment, and so on). At 714, the method 700 includes performing maintenance and service on the aircraft. The method 700 may include performing maintenance and service on the aircraft take-off recommendation system. For example, maintenance and service of the sensor data storage and analysis system may include replacing one or more of the system 200, the engine 202, the aircraft display 204, and the aircraft deceleration equipment 206.

Referring to FIG. 8, a block diagram of an illustrative implementation of the aircraft 100 that includes components of an aircraft take-off recommendation system is shown. In at least one implementation, the aircraft 100 is produced by at least a portion of the method 700 of FIG. 7. As shown in FIG. 8, the aircraft 100 includes an airframe 818, the engine 202, the aircraft display 204, the aircraft deceleration equipment 206, a plurality of systems 820, and an interior 822. Examples of the plurality of systems 820 include one or more of a propulsion system 824, an electrical system 826, an environmental system 828, a hydraulic system 830, and a sensor system 832. The sensor system 832 includes one or more sensors onboard the aircraft 100 and configured to generate sensor data during operation of the aircraft 100. The sensor data indicates one or more parameter values of at least one operational parameter measured by the one or more sensors and one or more timestamps associated with the one or more parameter values.

The aircraft 100 also includes the system 200. The system 200 includes the engine-related event detection circuitry 210, the speed sensor 212, the flight-time tracker 214, the memory 215, the look-up table processor 217, the comparison unit 218, the indication generator 220, and the deceleration initiator 222.

Any number of other systems may be included in the aircraft 100. Although an aerospace example is shown, the present disclosure may be applied to other industries. For example, the system 200 may be used onboard a manned or unmanned aircraft (such as a satellite, a watercraft, or a land-based vehicle).

Apparatus and methods included herein may be employed during any one or more of the stages of the method 700 of FIG. 7. For example, components or subassemblies corresponding to production process 708 may be fabricated or manufactured in a manner similar to components or subassemblies produced while the aircraft 100 is in service, at 712 for example and without limitation. Also, one or more apparatus implementations, method implementations, or a combination thereof may be utilized during the production stages (e.g., stages 702-710 of the method 700), for example, by substantially expediting assembly of or reducing the cost of the aircraft 100. Similarly, one or more of apparatus implementations, method implementations, or a combination thereof may be utilized while the aircraft 100 is in service, at 100 for example and without limitation, to maintenance and service, at 714.

Figure 9A:
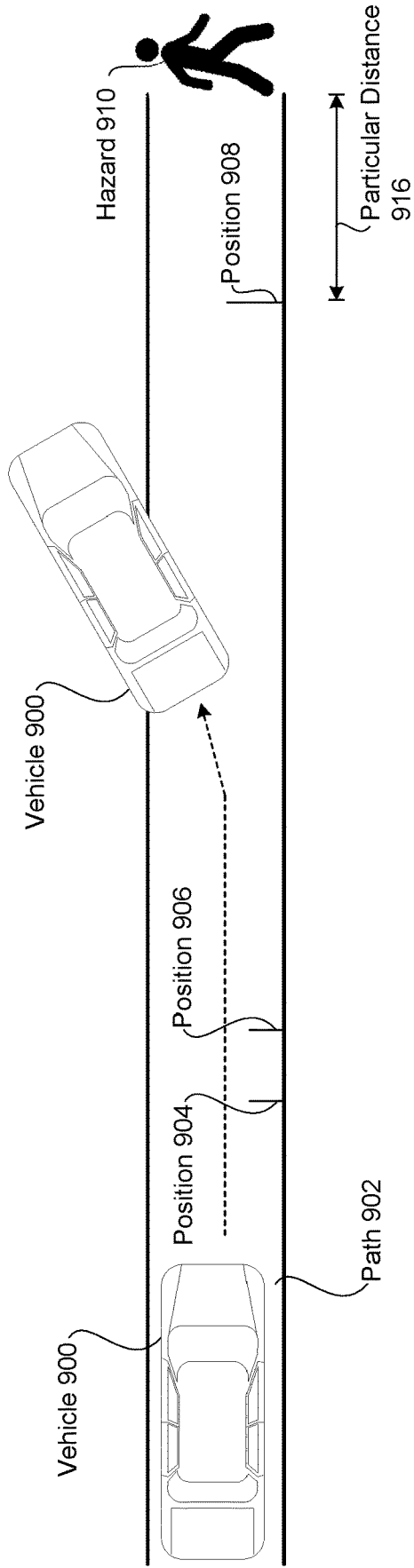
FIG. 9A is a diagram of a vehicle redirecting its path after detection of a hazard.

FIG. 9A is a diagram of a vehicle 900 redirecting its path after detection of a hazard. In FIG. 9A, the vehicle 900 is travelling down a path 902. For example, the vehicle 900 is travelling from left to right along the path 902. In FIG. 9A, the vehicle 900 is a car. However, in other implementations, the vehicle 900 may be a train, a truck, a motorcycle, a bicycle, a tricycle, a boat, etc.

According to FIG. 9A, the vehicle 900 may detect a hazard 910 along the path 902 of the vehicle 900 when the vehicle 900 is at a position 904. As illustrated in FIG. 9A, the hazard 910 is a person crossing the path 902. However, in other implementations, the hazard 910 may be a pothole, a motionless vehicle, etc. A particular time after the vehicle 900 detects the hazard 910, the vehicle 900 is at a position 906 on the path 902.

Figure 9B:
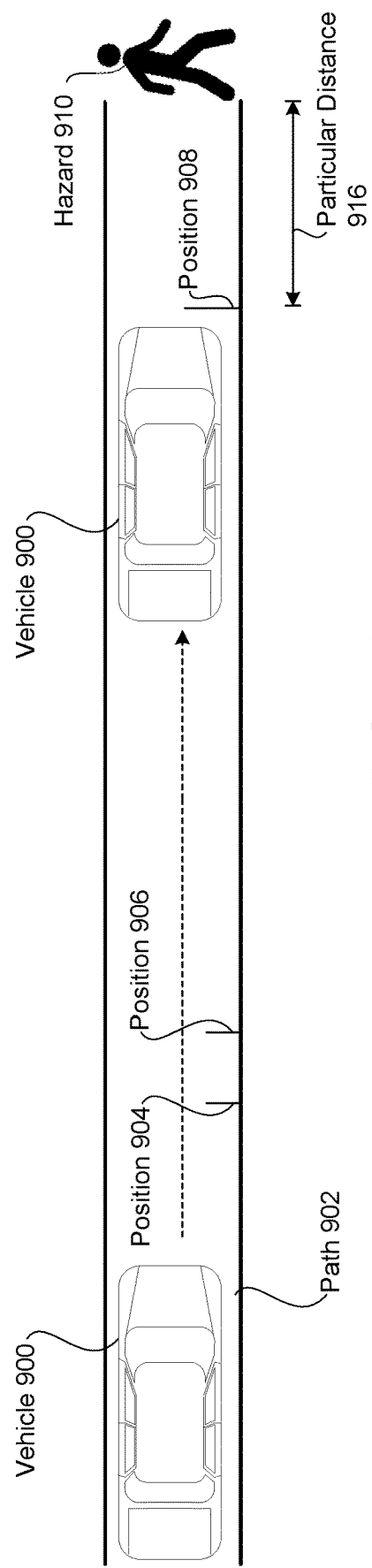
FIG. 9B is a diagram of the vehicle bypassing redirection of its path after detection of the hazard.

When the vehicle 900 is at the position 906, a device within the vehicle 900 recommends whether to redirect the vehicle 900 (as illustrated in FIG. 9A) or to bypass redirecting the vehicle 900 (as illustrated in FIG. 9B). The decision of whether to redirect the vehicle 900 is based on a speed of the vehicle 900 at the position 906. For example, in a similar manner as described with respect to the simulator 216, a simulator (not shown) estimates a speed threshold that would result in the vehicle 900 stopping prior to a particular distance 916 from the hazard 910.

Thus, the decision of whether to redirect the vehicle 900 is based on whether the vehicle 900 can come to a stop prior to the particular distance 916 from the hazard 910. For example, in FIG. 9A, the device determines the speed of the vehicle 900 is greater than the speed threshold. As a result, the vehicle 900 will not be able to come to a stop before the vehicle 900 reaches a position 908 that is the particular distance 916 from the hazard 910. Thus, the device recommends redirecting the vehicle 900 for safety reasons. As another example, in FIG. 9B, the device determines the speed of the vehicle 900 is less than or equal to the speed threshold. As a result, the vehicle 900 will be able to come to a stop before the vehicle reaches the position 908. Thus, the vehicle bypasses redirection and applies breaks to stop for safety reasons. Thus, the techniques described with respect to FIGS. 9A-9B enable the device to recommend whether to redirect the vehicle 900 after the hazard 910 is detected.

Figure 10:
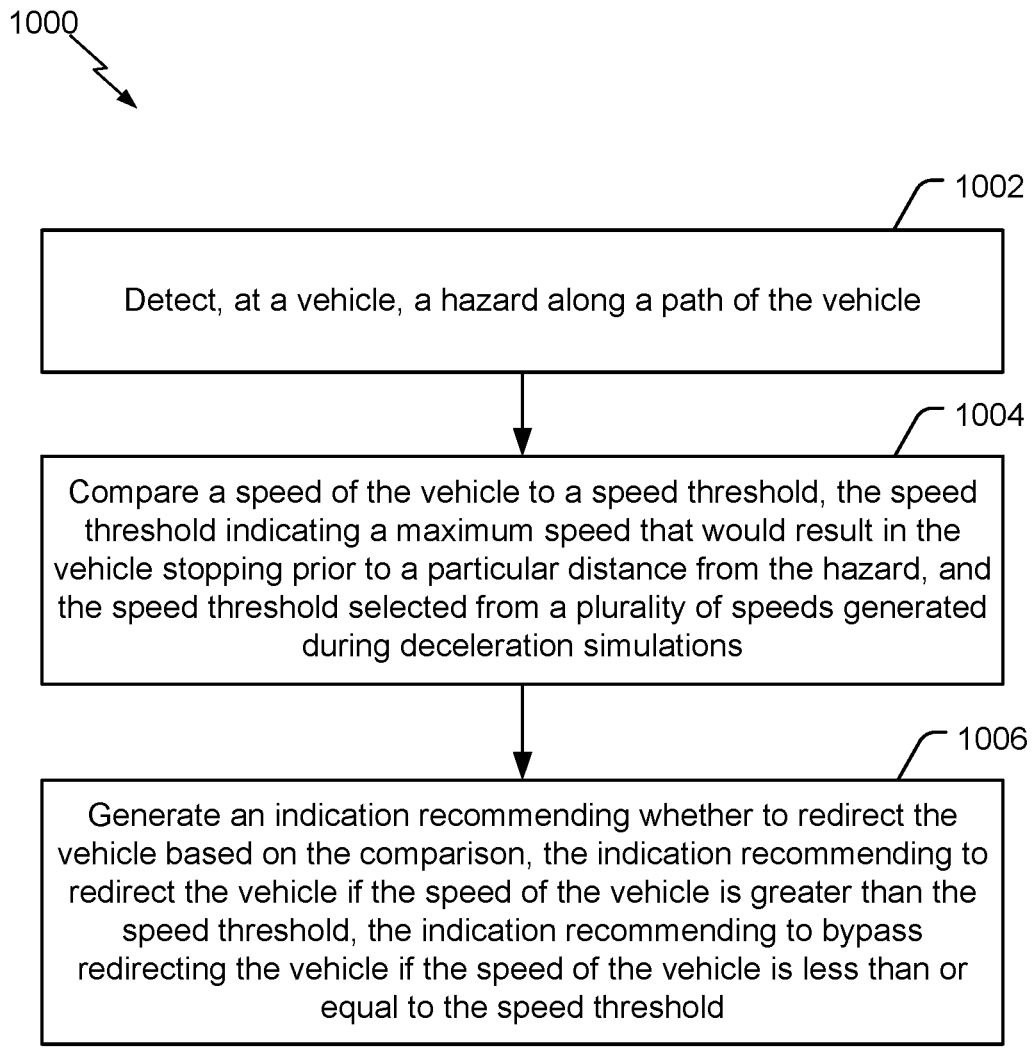
FIG. 10 is a flow chart of a method for generating a recommendation during motion of a vehicle.

Referring to FIG. 10, a method 1000 for generating a recommendation during motion of a vehicle is shown. The method 1000 is performed by the one or more components of the vehicle 900. In particular, the method 1000 may be performed by a device (within the vehicle) that is substantially similar to the system 200 of FIG. 2A.

The method 1000 includes detecting, at a vehicle, a hazard along a path of the vehicle, at 1002. For example, a device within the vehicle 900 detects the hazard 910 along the path 902 of the vehicle 900 when the vehicle is at the position 904.

The method 1000 also includes comparing a speed of the vehicle to a speed threshold, at 1004. The speed threshold indicates a maximum speed that would result in the vehicle stopping prior to a particular distance from the hazard, and the speed threshold is selected from a plurality of speeds generated during deceleration simulations. For example, in a similar manner as the system 200 of FIG. 2A, the device compares the speed of the vehicle 900 to a speed threshold. The speed threshold is selected by accessing a look-up table having a plurality of speeds. Each speed of the plurality of speeds is associated with different vehicle parameters. Each speed also indicates a stopping distance based on corresponding vehicle parameters. A table look-up operation is also performed to select the speed threshold. The table look-up operation includes providing one or more parameters of the vehicle 900 as an input to the look-up table to identify speeds within the look-up table that have vehicle parameters that are similar to the one or more parameters of the vehicle 900. The table look-up operation also includes selecting, from the identified speeds, a highest speed that indicate a stopping distance that is less than a difference between the remaining distance and the particular distance. The highest speed corresponds to the speed threshold.

The method 1000 also includes generating an indication recommending whether to redirect the vehicle based on the comparison, at 1006. The indication recommends redirecting the vehicle if the speed of the vehicle is greater than the speed threshold. The indication recommends bypassing redirection of the vehicle if the speed of the vehicle is less than or equal to the speed threshold. According to some implementations, the method 1000 includes displaying the indication on a display of the vehicle. Thus, the method 1000 enables the device within the vehicle 900 to recommend whether to redirect the vehicle 900 after the hazard 910 is detected.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method for generating a recommendation during a take-off associated with an aircraft, the method comprising:

selecting, at a processor for a particular take-off operation, a take-off rejection speed threshold from a look-up table based on a plurality of parameters, the plurality of parameters including a runway friction, the take-off rejection speed threshold indicating a maximum aircraft speed that would result in the aircraft stopping prior to a particular distance from an end of a runway, and the look-up table storing a plurality of aircraft speeds generated during aircraft deceleration simulations, wherein the take-off rejection speed threshold is selected from the look-up table prior to the particular take-off operation beginning;

detecting, at the processor, an engine-related event during the particular take-off operation;

comparing, at the processor, a speed of the aircraft a particular time after the engine-related event to the take-off rejection speed threshold;

generating an indication, at an indication device, recommending whether to continue the particular take-off operation based on comparison, the indication recommending to discontinue the particular take-off operation if the speed of the aircraft is less than or equal to the take-off rejection speed threshold, and the indication recommending to continue the particular take-off operation if the speed of the aircraft is greater than the take-off rejection speed threshold; and initiating deceleration of the aircraft, by the processor via aircraft deceleration equipment, in response to a determination that the indication recommends to discontinue the particular take-off operation.

2. The method of claim 1, wherein the take-off rejection speed is not recalculated during the particular take-off operation.

3. The method of claim 1, wherein the indication is an audio indication.

4. The method of claim 1, wherein the indication is associated with a light in a cockpit of the aircraft.

5. The method of claim 1, further comprising selecting the take-off rejection speed threshold by:

accessing the look-up table, wherein each aircraft speed of the plurality of aircraft speeds of the look-up table is associated with a different plurality of parameters; and performing a table look-up operation to select the take-off rejection speed threshold, the table look-up operation comprising:

providing the plurality of parameters as an input to the look-up table to identify a particular aircraft speed associated with the plurality of parameters; and selecting the particular aircraft speed as the take-off rejection speed threshold.

6. The method of claim 5, wherein the plurality of parameters include a weight of the aircraft, wind conditions surrounding the aircraft, a pilot identification, or a length of the runway.

7. The method of claim 5, wherein the look-up table is generated using an aircraft simulator for a particular aircraft that is similar to the aircraft.

8. The method of claim 1, wherein the particular distance from the end of the runway includes a safety measure to account for pilot reaction time.

9. The method of claim 1, wherein the particular time corresponds to less than one second.

10. The method of claim 1, wherein the engine-related event comprises an engine shutdown.

11. The method of claim 1, wherein the speed of the aircraft a particular time after the engine-related event is compared to the take-off rejection speed threshold responsive to detecting the engine-related event, and wherein the indication is generated responsive to detecting the engine-related event.

12. An aircraft comprising:

an engine; and a system configured to, via a processor, perform operations including:

select, for a particular take-off operation, a take-off rejection speed threshold from a look-up table based on a plurality of parameters, the plurality of parameters including a runway friction, the take-off rejection speed threshold indicating a maximum aircraft speed that would result in the aircraft stopping prior to a particular distance from an end of a runway, and the look-up table storing a plurality of aircraft speeds generated during aircraft deceleration simulations, wherein the take-off rejection speed threshold is selected from the look-up table prior to the particular take-off operation beginning;

detect an event during the particular take-off operation;

compare a speed of the aircraft a particular time after the event to the take-off rejection speed threshold; and generate an indication, at an indication device, recommending whether to continue the particular take-off operation based on comparison, the indication recommending to discontinue the particular take-off operation if the speed of the aircraft is less than or equal to the take-off rejection speed threshold, and the indication recommending to continue the particular take-off operation if the speed of the aircraft is greater than the take-off rejection speed threshold; and aircraft deceleration equipment that is configured to initiate deceleration of the aircraft in response to a determination by the processor that the indication recommends to discontinue the particular take-off operation.

13. The aircraft of claim 12, further comprising an aircraft display, wherein the system is further configured to display the indication on the aircraft display.

14. The aircraft of claim 12, wherein the take-off rejection speed is not recalculated during the particular take-off operation.

15. The aircraft of claim 12, wherein the system is further configured to:

access the look-up table, wherein each aircraft speed of the plurality of aircraft speeds of the look-up table is associated with a different plurality of parameters;

provide the plurality of parameters as an input to the look-up table to identify a particular aircraft speed associated with the plurality of parameters; and select the particular aircraft speed as the take-off rejection speed threshold.

16. The aircraft of claim 15, wherein the plurality of parameters include a weight of the aircraft, wind conditions surrounding the aircraft, a pilot identification, or a length of the runway.

17. The aircraft of claim 15, wherein the look-up table is generated using an aircraft simulator for a particular aircraft that is similar to the aircraft.

18. The aircraft of claim 12, wherein the particular distance from the end of the runway includes a safety measure to account for pilot reaction time.

19. The aircraft of claim 12, wherein the particular time corresponds to less than one second.

20. A method for generating a recommendation, the method comprising:

selecting, at a processor, a speed threshold from a look-up table based on a plurality of parameters, the plurality of parameters including a surface friction, the speed threshold indicating a maximum vehicle speed that would result in a vehicle stopping prior to a particular distance from a hazard, and the look-up table storing a plurality of vehicle speeds generated during vehicle deceleration simulations, wherein the speed threshold is selected from the look-up table prior to the vehicle moving along a path;

detecting, at the processor, the hazard along the path of the vehicle;

performing a comparison, at the processor, of a speed of the vehicle to the speed threshold;

generating an indication, at an indication device, recommending whether to redirect the vehicle based on the comparison, the indication recommending to redirect the vehicle if the speed of the vehicle is greater than the speed threshold, the indication recommending to bypass redirecting the vehicle if the speed of the vehicle is less than or equal to the speed threshold; and initiating deceleration of the vehicle, by the processor via vehicle deceleration equipment, in response to a determination that the indication recommends to bypass redirecting of the vehicle.

21. The method of claim 20, wherein the vehicle is a car, a truck, a train, a motorcycle, a bicycle, a tricycle, or a boat.

22. The method of claim 20, further comprising displaying the indication on a display of the vehicle.

\* \* \* \* \*